UNITED STATES PATENT OFFICE.

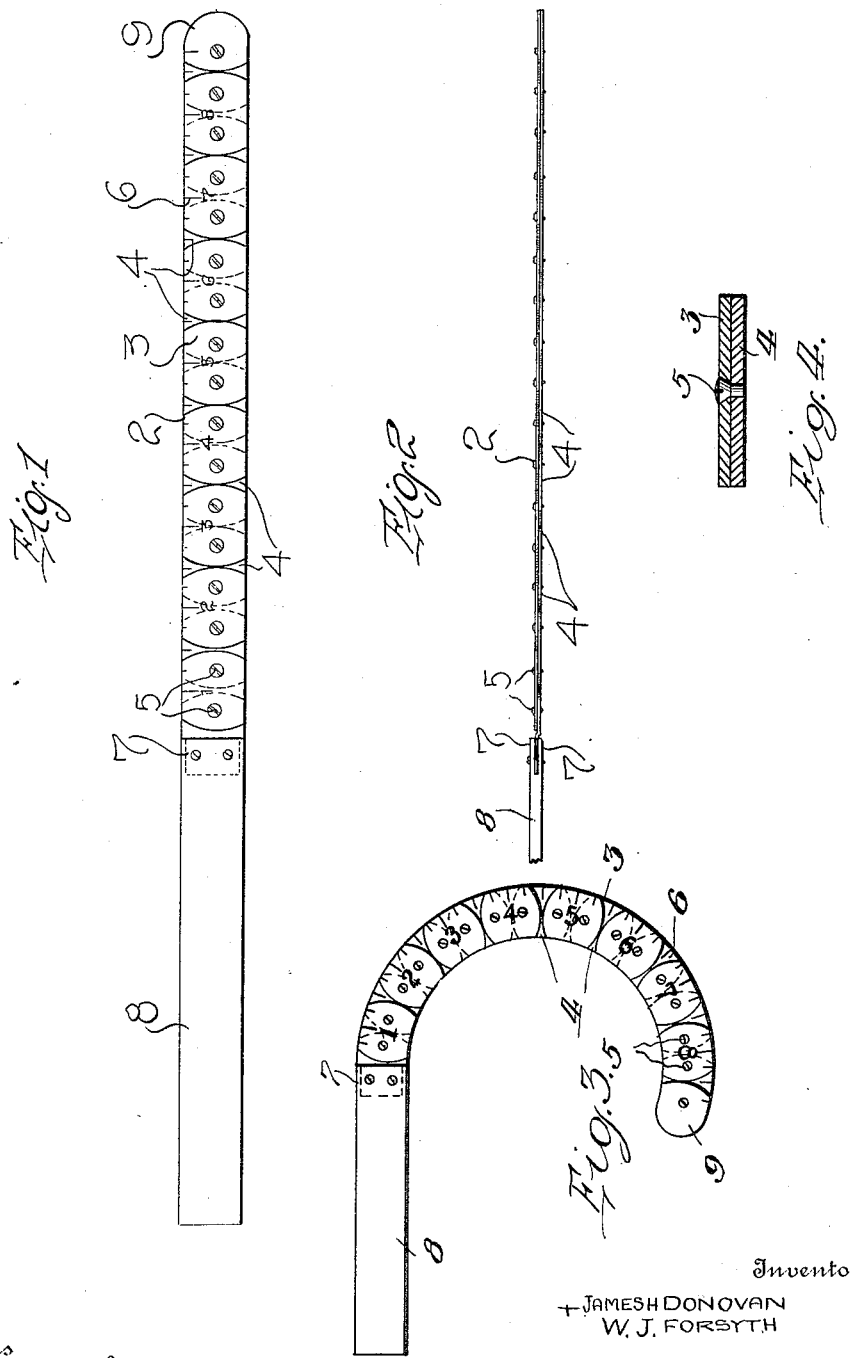

JAMES H. DONOVAN AND WILLIAM J. FORSYTH, OF BUFFALO, NEW YORK.

MEASURING INSTRUMENT.

1,130,072.  Specification of Letters Patent.  Patented Mar. 2, 1915.

Application filed February 11, 1914. Serial No. 818,153.

*To all whom it may concern:*

Be it known that we, JAMES H. DONOVAN and WILLIAM J. FORSYTH, citizens of the United States, residing at Buffalo, in the county of Erie and State of New York, have invented certain new and useful Improvements in Measuring Instruments, of which the following is a specification, reference being had to the accompanying drawings.

This invention relates to new and useful improvements in measuring instruments and more particularly to a flexible instrument formed of a plurality of pivotally connected sections having a handle member connected to one end of the instrument, the object of the invention being to provide an instrument of the above character which is particularly adapted for use in measuring pipe holes for cutting and in fact can be used for measuring anything from a circle to a square.

Another object of the present invention is the provision of a measuring instrument of the above character which will possess advantages in points of efficiency and durability, is inexpensive to manufacture and at the same time is simple in construction and operation.

With the above and other objects in view, the invention consists in the novel features of construction and the combination and arrangement of parts to be hereinafter more fully described, pointed out in the claim and shown in the accompanying drawings, in which—

Figure 1 is a plan view of a measuring instrument constructed in accordance with our invention; Fig. 2 is a side elevation. Fig. 3 is a top plan view illustrating the device as adapted to be applied to a circular object; and Fig. 4 is a transverse sectional view taken through the pivotal connection.

In carrying out our invention, we form the body portion 1 of the instrument of a plurality of sections indicated at 2, each section formed of a flat piece of sheet metal of a substantial length, thickness and width and rounded at each end, as shown at 3, 3. In connecting the sections 2 together, we provide a plurality of connecting plates 4, the ends of which are arranged along side the ends of the sections 2 and are pivotally connected to the ends of the sections 2 by means of the removable screws 5, said screws forming suitable pivots upon which the sections 2 are adapted to swing.

The sections of the body 1 are graduated, as illustrated at 6, so that when the sections are arranged in circular relation or in any other position, the measurement of an opening, circle, square or the like may be readily taken. It will be noted that the sections of the body 1 are so connected that they may be readily arranged in any desired position when cutting a circle, arc, oval, square, or any other desired shape. It will be noted that the section at the inner end of the body 1 is preferably squared off and adapted to be pivotally connected between the two spaced ears 7 formed at one end of the handle member 8. The section at the outer end of the body portion 1 is rounded off, as shown at 9, similar to the rounding portions 3 of the sections 2. The handle member 8 is formed of a flat piece of metal and is preferably of the same width as the body portion of the instrument so that the handle and the body portion may be arranged in longitudinal alinement to present a perfectly straight line. It will be noted that by arranging the body portion 1 and the handle member 8 in longitudinal alinement, the person using the measuring instrument will have a straight edge to work upon.

From the above description taken in connection with the accompanying drawings, it will be readily apparent that we have provided a measuring instrument which is particularly adapted for use by carpenters, stone masons, tinsmiths and glaziers and is so constructed that the person using the same may readily adjust the body portion of the instrument to the position or angle which is desired to be cut. It will be noted that the sections of the instrument are pivotally connected so that there is sufficient friction between the sections to retain the same in an adjusted position after being manually moved to such position. It will be noted that we have provided an advantageous feature over prior devices of this character wherein the body portion of the instrument and the handle are arranged in longitudinal alinement to present a straight edge and also to provide a device which can be quickly and readily folded against the handle so that the same will occupy comparatively small space when not in use. It will also be apparent from the above that the device is extremely simple in construction and can be manufactured at comparatively low cost.

While we have shown and described the preferred form of our invention, it will be obvious that various changes in the details of construction and in the proportions may be resorted to for successfully carrying our invention into practice without sacrificing any of the novel features or departing from the scope of the appended claim.

What we claim is:—

The combination with a handle member having spaced ears formed in its outer end, of a flexible body formed of a plurality of pivotally connected sections, said sections being frictionally engaged with one another, whereby they will be retained in an effective position after being placed in such position, the innermost of said sections having a reduced portion adapted to be fitted between the spaced ears of the handle, and means for securing the innermost section to the handle, the longitudinal edges of the flexible body being disposed in alinement with the longitudinal edges of the handle, whereby a continuous line may be drawn along the handle and body member.

In testimony whereof we hereunto affix our signatures in the presence of two witnesses.

JAMES H. DONOVAN.
WILLIAM J. FORSYTH.

Witnesses:
WILLIAM J. LOAD,
JNO. J. RYAN.

Copies of this patent may be obtained for five cents each, by addressing the "Commissioner of Patents, Washington, D. C."